Patented Sept. 6, 1949

2,481,455

UNITED STATES PATENT OFFICE 2,481,455

CESIUM BROMIDE SEPARATION

Vernon A. Stenger, Midland, Mich., assignor to The Dow Chemical Company, Midland, Mich., a corporation of Delaware No Drawing. Application June 1, 1948, Serial No. 30,510

3 Claims. (Cl. 23—89)

The invention relates to methods of separating cesium compounds from cesium-containing mixtures. It more particularly concerns an improved method of separating cesium as the bromide from cesium-containing ores, especially pollucite.

Cesium occurs in combined form in lepidolite, a lithia mica; in carnallite, a hydrous chloride of potassium and magnesium; and sometimes in beryl, a beryllium aluminum silicate. The most important source of cesium is the mineral pollucite, which is a silicate of cesium and aluminum having the theoretical composition:

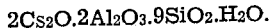

$2Cs_2O.2Al_2O_3.9SiO_2.H_2O$.

This mineral, which may be termed a cesium ore, is found in various states of purity, being contaminated oftentimes with various amounts of other alkali metals: e. g. $Na_2O$, $K_2O$, $Rb_2O$, $Li_2O$, as well as $H_2O$, $Pb_2O$, and traces of copper, calcium, iron, magnesium, chromium, and molybdenum. Insofar as I am aware, there is no commercially satisfactory method of separating the cesium values from the cesium-containing minerals. In particular, there is no satisfactory method now commercially available for separating cesium bromide from the other bromides into which the metallic constituents of cesium ores may be converted by various known methods.

The principal object of the invention is to provide a method of separating cesium bromide from mixtures of alkali metal bromides. Another object is to provide a method of obtaining cesium as the bromide from cesium-containing minerals, e. g. pollucite, as the monobromide. Other objects and advantages will appear as the description of the invention proceeds.

Briefly the method of the invention comprises treating the cesium-containing mineral or ore with hydrobromic acid so as to convert the alkali and other metal components of the raw material into bromides in aqueous solution, precipitating the alkali metal bromides with isopropyl alcohol, and dissolving cesium bromide from the precipitate with liquid bromine from which the cesium bromide is thereafter recovered by crystallization. When the mixture from which the cesium is to be separated comprises essentially only alkali metal bromides, the step of precipitation with isopropyl alcohol may be omitted.

In carrying out the method briefly outlined above, the raw material containing the cesium is crushed or pulverized, if necessary, preferably to particles as small as 100 mesh. The raw material is digested in an aqueous solution of hydrogen bromide. Commercial hydrobromic acid may be used, of which suitable concentrations are between about 10 and 48 per cent. The usual commercial concentration is about 40 per cent HBr by weight. The amount of hydrobromic acid to use is based upon the stoichiometric relation of the alkali and other metal content of the raw material to the bromine content of the hydrobromic acid and should be sufficient at least to convert the metals or metallic oxides in the raw material into bromides according to their stoichiometric reactions. It is preferable to employ up to about 30 per cent more hydrogen bromide than is actually stoichiometrically equivalent to the metal content of the raw material. The digestion or reaction of the hydrobromic acid and the raw material is facilitated by heating and it is preferable to conduct this operation at or near the boiling point of the hydrobromic acid solution. In order to prevent loss of hydrobromic acid from the reaction mixture during digestion, the reaction is best carried out in a vessel fitted with a reflux condenser whereby vaporized hydrobromic acid is condensed and returned to the reaction mass. The conversion of the alkali and other metals in the raw material into bromides by the foregoing procedure requires about ½ to 2 hours. Completion of the reaction may be ascertained by filtering a portion of the reaction mass, washing the solids thus obtained, and testing them for the presence of cesium by conventional qualitative methods.

After the raw material has been digested in the hydrobromic acid solution, the mixture is cooled preferably to about room temperature and the undissolved portion or gangue is separated from the reaction mass, as by filtration. The gangue is washed with water and the washings may be added to the filtrate. The aqueous solution thus obtained contains the cesium of the original raw material as cesium bromide, together with the bromides of other metallic elements originally present and the hydrobromic acid which is not used up in the digestion reaction.

The aqueous solution obtained by digesting the raw material, after separating the gangue from it, is concentrated by evaporation. This operation may be conducted by boiling the solution at atmospheric pressure until the temperature of the boiling solution rises to between about 130° and 140° C. During the boiling, hydrobromic acid left over from the digestion step is vaporized. The vaporized hydrobromic acid may be recovered by condensation and reused in the first step if desired.

The concentrated bromide solution thus obtained, more or less freed from hydrobromic acid, is cooled to a temperature below about 60° C. and near that at which crystallization of metallic bromides therein begins. In this way a solution is obtained which is just saturated, the temperature being below about 60° C. Cooling below room temperature or about 20° C. is not desirable or necessary.

The concentrated bromide solution is treated with isopropyl alcohol, thereby to precipitate the alkali metal bromides which are relatively insoluble, I have found, in aqueous solutions containing isopropyl alcohol. To bring about the precipitation it is preferable to use the constant boiling mixture of isopropyl alcohol and water which has a concentration of about 88 per cent, although the alcohol may be used undiluted. In carrying out this step, the alcohol, diluted or otherwise, is mixed with the concentrated bromide solution at a temperature below that at which the alcohol boils, viz. 82.3° C. A suitable temperature is between about 60° C. and 20° C. The completeness of the precipitation depends upon the relative amounts of alcohol and water in the treated mixture. I have found that satisfactory results are had when the volume of alcohol relative to that of the bromide solution is between about 1½ to 1 and 3 to 1, although larger amounts of the alcohol may be used such as up to 4 parts of alcohol to 1 of the solution. An excellent separation is had upon using about 2.5 volumes of 88 per cent isopropyl alcohol to 1 volume of the bromide solution. While the alkali metal bromides are less soluble in the alcoholic bromide solution and, therefore, are precipitated by the addition of the alcohol, other bromides, particularly those of aluminum and iron, remain dissolved so that these bromides may be separated from the others.

After precipitating the alkali metal bromides they are separated from the alcoholic solution as by filtration. The separated alkali metal bromide precipitate may be washed free from the mother liquor with isopropyl alcohol and the washings combined, if desired, with the separated alcoholic solution. Thereafter, the isopropyl alcohol may be recovered by distillation and re-used in the process.

The washed precipitate may be dried to remove adhering alcohol solution by heating in a steam-heated oven, for example, and the alcohol thereby vaporized recovered for re-use. In some instances, complete removal of iron is not had by the alcohol treatment, and this incompletely removed iron may be eliminated from the dried precipitate by dissolving the precipitate in water, precipitating the iron in the resulting solution with sodium hydroxide solution, filtering off the precipitated iron hydroxide, and then evaporating the filtered solution to dryness, thus yielding an iron- and aluminum-free alkali bromide mixture. In most instances, as when extreme purity is not desired, the alkali bromides, precipitated by the isopropyl alcohol treatment as already described, and after drying to remove the adhering alcohol solution, may be submitted to the next step in the process without the need for using the above described additional iron removal steps.

The dried alkali metal bromide mixture thus obtained, freed from iron or otherwise, is treated with liquid bromine, thereby to dissolve the cesium bromide and thus effect a separation thereof from the other alkali metal bromides of the mixture. One way to carry out this separation is to mix the alkali bromides with the liquid bromine and then separate the undissolved portion from the resulting solution, as by filtration. The amount of bromine to use depends upon the amount of cesium bromide in the mixture of alkali metal bromides to be treated. I have found that about 10 parts of bromine (by weight) for each part of cesium (as $Cs_2O$) in the mixture to be treated is generally suitable, although other amounts may be used. After dissolving the cesium bromide in the liquid bromine and separating, as by filtration, the undissolved matter from the resulting liquid bromine solution, the cesium bromide is recovered from the bromine solution by evaporating the liquid bromine from the solution. As the liquid bromine evaporates, crystals of cesium monobromide are formed substantially free from other alkali metal bromides. The bromine thus evaporated may be condensed and re-used in the process.

*Example*

The following example is illustrative of the method. 100 pounds of pollucite ore having the following analysis:

| | Per cent |
|---|---|
| $Cs_2O$ | 28.6 |
| $SiO_2$ | 46.0 |
| $Al_2O_3$ | 17.0 |
| $Na_2O$ | 2.1 |
| $K_2O$ | 0.5–1.0 |
| $Rb_2O$ | 0.5 |
| $Li_2O$ | 0.02–0.3 |
| $Tl_2O$ | 0.01 | and traces of Cu, Ca, Fe, Mg, Cr, Mo ground to about 100 mesh, is digested for two hours in about 24 gallons of 48 per cent hydrobromic acid maintained at a temperature just below boiling. The digested mass is filtered to remove the gangue. The gangue is washed with about 9 gallons of water and the washings added to the foregoing filtrate. The gangue dried at 120° C. weighs 53.9 pounds. The combined filtrate and washings are evaporated by boiling until the volume is reduced to about 24 gallons. The concentrated solution thus obtained is cooled to about 35° C. and about 60 gallons of 88 per cent (constant boiling) isopropyl alcohol is added. The resulting mixture is cooled to about 20° C. The alkali metal bromides thereby precipitated are filtered off and washed with about 60 gallons of 88 per cent isopropyl alcohol. If desired, the wash alcohol may be used without further treatment in the precipitation step or the isopropyl alcohol may be recovered from the filtrate and washings by a simple distillation at 80°–81° C. The washed precipitate thus obtained is dried. It comprises crude alkali metal bromides and weighs about 44.8 pounds. The dried precipitate is stirred with about 200 pounds of liquid bromine which dissolves the cesium bromide leaving the other alkali metal bromides undissolved. These are separated from the liquid bromine solution containing the cesium bromide by filtration through glass cloth and washed with about 70 pounds of liquid bromine. The washed undissolved bromides (mainly sodium bromide and potassium bromide), upon drying to remove adhering liquid bromine, weigh 7.5 pounds. The liquid bromine filtrate and washings are combined and subjected to evaporation to remove the liquid bromine. After the evaporation, there is recovered a residue of about 36.3 pounds of crystallized cesium monobromide. Spectrographic analysis of this product shows that it consists of high purity cesium monobromide with but small amounts of iron (0.033%), potassium (0.0005–0.0007%), and rubidium (0.3–0.5%) as impurities.

Other methods of converting the metallic constituents of the raw material pollucite into bromides may be used in preparation for the operation of separating of the cesium bromide therefrom by the liquid bromine dissolving method set forth. One such procedure comprises fusing the ore with potassium bromide, whereby the alkali metal components of the ore are converted into bromides. These may be dissolved in water and the gangue separated by filtration. Another procedure consists in dissolving the ore in hydrochloric acid, saturating the solution with hydrogen chloride thereby to precipitate the aluminum chloride derived from the ore, and then converting the alkali chlorides in the solution into bromides by treatment with hydrobromic acid. Still another method is to digest the ore in hydrobromic acid and then saturate the solution with hydrogen bromide at relatively low temperature to precipitate aluminum bromide and leave the alkali metal bromides in solution for subsequent separation according to the procedures already set forth.

I claim:

1. The method of separating cesium bromide from mixtures of bromides of alkali metals which comprises subjecting the mixture to the dissolving action of liquid bromine whereby to dissolve the cesium bromide, leaving substantially undissolved the remaining halides of the alkali metals; separating the resulting liquid bromine solution from the undissolved alkali metal halides; and evaporating the liquid bromine from the separated liquid bromine solution so as to crystallize therefrom the cesium bromide.

2. The method of separating cesium as the bromide from a cesium-containing ore containing alkali metals, which comprises digesting the ore in hydrobromic acid, separating the gangue from the resulting bromide solution, adding isopropyl alcohol to the bromide solution so as to precipitate therein the alkali metal bromides including the cesium bromide, separating the precipitate from the solution, treating the precipitate with liquid bromine so as to dissolve the cesium bromide therein in the liquid bromine, separating the resulting solution of cesium bromide in liquid bromine from the undissolved portion of the precipitate, and evaporating the liquid bromine from the separated liquid bromine solution so as to crystallize therefrom cesium monobromide.

3. The method of separating cesium as the bromide from pollucite which comprises digesting the pollucite in hydrobromic acid containing 10 to 48 per cent of HBr by weight so as to dissolve and convert the metallic constituents of the pollucite into bromides, separating the gangue from the resulting solution, concentrating the separated solution until the atmospheric boiling point is between about 130° and 140° C., cooling the concentrated solution to between about 20° and 60° C., adding isopropyl alcohol to the cooled solution in the proportions of at least 1½ parts by volume of alcohol to 1 part of the solution so as to precipitate therein the alkali metal bromides, separating the precipitate from the solution, mixing the precipitate with liquid bromine in amount sufficient to dissolve the cesium bromide present in the precipitate, separating the liquid bromine solution of cesium bromide thus obtained, and evaporating the liquid bromine from the cesium bromide solution so as to crystallize cesium bromide therefrom.

VERNON A. STENGER.

No references cited.